United States Patent [19]
Steele

[11] 3,785,223
[45] Jan. 15, 1974

[54] ROTARY INDEXING MACHINE
[75] Inventor: Richard C. Steele, Warwick, R.I.
[73] Assignee: The Cleveland Twist Drill Company, Cleveland, Ohio
[22] Filed: June 5, 1972
[21] Appl. No.: 259,662

[52] U.S. Cl. .................................. 74/815, 74/818
[51] Int. Cl. ........................................... B26h 29/32
[58] Field of Search .................. 74/818, 815, 813 R; 279/5; 90/57

[56] References Cited
UNITED STATES PATENTS
2,590,119   3/1952   Osterhus ........................... 74/813 R
3,540,312   11/1970  Russ .................................. 74/813 R Primary Examiner—Charles J. Myhre
Assistant Examiner—F. D. Shoemaker
Attorney—Frank C. Henry and Roy F. Hollander

[57] ABSTRACT

A rotary indexing machine comprising a housing, a spindle mounted for rotation in the housing, an index plate mounted on the spindle substantially coaxially therewith, means for mounting a workpiece-holding member substantially coaxially with the spindle, a fluid motor for continuously rotating the spindle in one direction about its axis, the motor being located within the housing substantially concentric with the spindle and positioned between the index plate and the means for mounting the workpiece-holding means, means for periodically arresting rotation of the spindle for a predetermined interval of time during which the workpiece may be machined, and means for periodically releasing the rotation arresting means. The means for periodically arresting rotation of the spindle for automatic step indexing, may be easily rendered inoperative so that thereafter the spindle will be rotated continuously without step indexing. The preferred embodiment also includes means for moving the spindle axis through an arc relative to a horizontal position and means for adjusting the spindle angularly about its axis and relative to the location plane of the index plate, whereby the location sides of the notches of the index plate may be accurately aligned with premachined notches existing in the workpiece.

19 Claims, 17 Drawing Figures

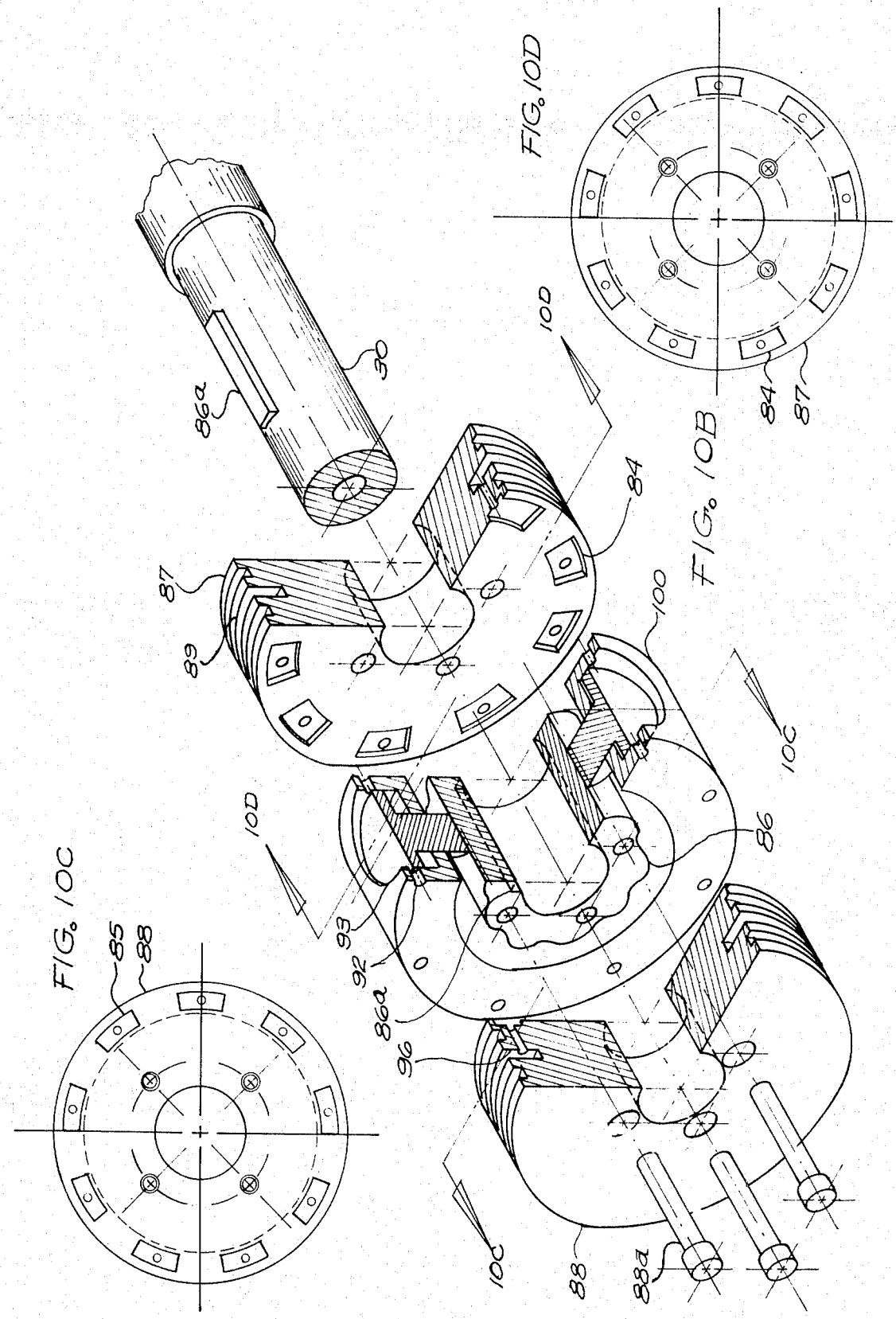

ROTARY INDEXING MACHINE

BACKGROUND OF THE INVENTION

The spindle of the rotary indexing machine of this invention is rotated by a fluid motor which is located within a housing substantially concentric with the spindle and between the index plate and the means for mounting the workpiece-holding means. The machine may be used for accurate automatic step indexing in the manufacture of saws, toothed wheels and similar circle-like plates with interrupted peripheries. By temporarily disconnecting the automatic step indexing means, the same machine may be used with the fluid motor continuously rotating the spindle to generate the outer periphery of the workpiece concentric with the features generated during the step indexing cycle. The machine is so constructed that by movement of the housing for the fluid motor and the other parts relative to the base, the axis of the spindle may be tilted above or below a horizontal position to permit forming angular surfaces on the periphery of the workpiece. In addition, the machine includes means for adjusting the spindle angularly about its axis relative to the location plane of the index plate so that the location side of each notch of the index plate may be accurately aligned with a premachined notch in the workpiece.

Indexing machines which include rotary type fluid motors are shown in the following U.S. Pat. Nos.: 2,453,600 Nov. 9, 1948 Soden; 2,645,981 July 21, 1953 Hirvonen; 2,796,776 June 25, 1957 Locke, Sr. et al.; 3,277,789 Oct. 11, 1966 Graham; 3,424,319 Jan. 28, 1969 Hohlfelder, Jr. et al.

The fluid motors of the Soden, Hirvonen and Graham devices are not substantially concentric with the spindle nor located within a housing between the index plate and the means for mounting the workpiece-holding means. Furthermore, they do not include means for movement of a housing relative to a base so that the axis of the spindle may be titled above or below horizontal nor any means for adjusting the spindle angularly about its axis relative to the location plane of the index plate so that the location side of each notch of the index plate may be accurately aligned with a premachined notch in the workpiece.

In the devices shown and described in the Locke, Sr. and the Hohlfelder, Jr. et al. patents, the fluid motors are substantially concentric with the spindle but the motors cannot be operated to continuously rotate the spindle. The fluid motors of these patents are not located between the index plate and the means for mounting the workpiece holding means and the devices of these patents lack all of the other above-mentioned elements of the Soden, Hirvonen and Graham devices.

While Curtis U.S. Pat. No. 2,309,241 dated Jan. 26, 1943 for a rotary dividing head discloses means for holding a housing for a spindle with the axis of the spindle titled to various positions relative to a horizontal position, it does not disclose any means for moving the housing relative to the base, any fluid motor or any other type of motor for continuously rotating the spindle in one direction about its axis, nor any means for adjusting the spindle angularly about its axis relative to the location plane of the index plate so that the location side of each notch of the index plate may be accurately aligned with a premachined notch in the workpiece.

While Orcutt U.S. Pat. No. 1,442,537 dated Jan. 26, 1923 discloses means for adjusting the spindle angularly about its axis relative to the location plane of the index plate, it does not disclose any fluid motor or any other means for continuously rotating the spindle in one direction about its axis, nor any means for moving a housing for the spindle relative to the base so that the axis of the spindle may be tilted above or below horizontal.

While U.S. Pats. to Benjamin, No. 2,883,886, dated Apr. 28, 1959, Hediger No. 3,030,826, dated Apr. 24, 1962, and to Dugas No. 3,186,260 dated June 1, 1965 disclose means for automatic step indexing, they do not disclose the use of fluid motors, nor means for continuously rotating the spindle in one direction about its axis, nor means for moving the spindle axis through an arc relative to a horizontal position, nor means for adjusting the spindle about its axis relative to the location plane of the index plate so that the location side of each notch of the index plate may be accurately aligned with a premachined notch in the workpiece.

SUMMARY OF THE INVENTION

One object of this invention is to provide a new and improved rotary indexing machine.

Another object is to provide such a machine which includes a fluid motor for continuously rotating the spindle in one direction about its axis.

Another object is to provide such a machine which includes a fluid motor for continuously rotating the spindle in one direction about its axis wherein the motor is located within a housing concentric with the spindle and positioned between the index plate and the means for mounting the workpiece-holding means.

Still another object is to provide such a machine which includes means for periodically arresting rotation of the spindle for a predetermined interval of time during which the workpiece may be machined and means for periodically releasing the rotation of the arresting means to provide automatic step indexing.

Another object is to provide such a machine wherein the means for automatic step indexing may be easily rendered inoperative so that thereafter the spindle will be rotated continuously without step indexing to generate the outer periphery of the workpiece concentric with the features generated during the step indexing cycle.

Still another object is to provide such a machine which includes means for moving the spindle axis through an arc relative to a horizontal position to permit forming angular surfaces on the periphery of the workpiece.

Still a further object is to provide such a machine with means for adjusting a spindle angularly about its axis and relative to the location plane of the index plate whereby the location sides of the notches of the index plate may be accurately aligned with premachined notches existing in the workpiece.

Other objects and advantages of the invention will be apparent from the following description taken in conjunction with the accompanying drawings.

According to one aspect of the present invention, a rotary index machine is provided which includes a housing, a spindle mounted for rotation in the housing, an index plate mounted adjacent to one end of the spindle substantially coaxially therewith, means at the other end of the spindle for mounting a workpiece-holding member substantially coaxially with the spindle, a fluid motor for continuously rotating the spindle in one direction about its axis, the motor being located within the housing substantially concentric with the spindle and positioned between the index plate and the means for mounting the workpiece-holding means, means for periodically arresting rotation of the spindle for a predetermined interval of time during which the workpiece may be machined, and means for periodically releasing the rotation arresting means whereby a spindle is free for rotation by the fluid motor for a predetermined interval of time.

According to another aspect of the invention, the fluid motor comprises an inner member which is attached to the spindle substantially concentric therewith and has a series of spaced members extending outwardly from its periphery, an outer member which surrounds the inner member and is substantially concentric therewith but which has a surface which is spaced from the outer surface of the inner member for a progressively increasing distance for a portion thereof, a first port for admitting fluid medium under pressure at one locality of the space between the inner and outer members and a second port for conducting the pressure medium outwardly from said space at another locality of said space whereby the fluid medium causes the inner member and the spindle to be rotated in the direction of the flow of the fluid medium.

According to another aspect of the invention, the fluid motor comprises an inner member which is attached to the spindle substantially concentric therewith, an outer member which surrounds the inner member and which has an inner surface which is spaced from the outer surface of the inner member for a portion thereof to form a cavity, members mounted on the inner member and extending outwardly therefrom into the cavity, a first port for admitting fluid medium under pressure at one locality of the cavity and a second port for conducting the pressure medium outwardly from the cavity at another locality thereof, whereby the fluid medium causes the inner member and the spindle to be rotated in the direction of flow of the fluid medium.

According to another aspect of the invention, the fluid motor comprises an inner member which is attached to the spindle substantially concentric therewith, a plurality of outer members attached to the housing, each outer member including fluid operated reciprocating means and means co-acting with the inner member for continuously rotating it in one direction about its axis, means for admitting fluid medium under pressure to said reciprocating means and means for conducting the fluid medium outwardly from the reciprocating means.

According to another aspect of the invention, the fluid motor comprises an inner member which is attached to the spindle substantially concentric therewith, said inner member comprising a peripheral cam surface, an outer member which is attached to the housing, surrounds the inner member and is substantially concentric therewith, a plurality of fluid operated means, a plurality of spaced means extending radially inwardly from said fluid operating means towards the periphery of the inner member, means associated with the inner ends of said radially extending means for co-acting with said peripheral cam surface, means for supplying fluid medium under pressure to said fluid operating means for urging said radially extending means inwardly towards said peripheral cam surface, thereby causing axial rotation of said inner member, and means for conducting the pressure medium outwardly from said fluid operating means.

According to another aspect of the invention, the machine includes means for moving the spindle axis through a substantial arc from a horizontal position to permit forming angular surfaces on the periphery of the workpiece.

According to another aspect of the invention, the index plate comprises a series of spaced pre-machined notches and the machine also comprises means for adjusting the spindle angularly about its axis relative to the location plane of the index plate and means for releasably locking the means for adjusting in its adjusted position, whereby the location side of each notch may be accurately aligned with a pre-machined notch existing in the workpiece.

According to another aspect of the invention, the means for automatically step indexing may easily be rendered inoperative, and thereafter the fluid motor continuously rotates the spindle in one direction about its axis without step indexing, whereby the peripheries of the workpiece or of the workpiece-holding member may be machined or ground concentric with the axis of the spindle.

BRIEF DESCRIPTION OF THE DRAWINGS

In the drawings:

FIG. 10B is an exploded view in perspective showing certain of the elements of the fluid motor of FIGS. 10 and 10A;

FIG. 10C is a view showing the input distributor plate taken on the line 10C—10C of FIG. 10B;

FIG. 10D is a view of the exhaust distributor plate taken on the line 10D—10D of FIG. 10B.

DESCRIPTION OF THE PREFERRED EMBODIMENTS

Figure 1:
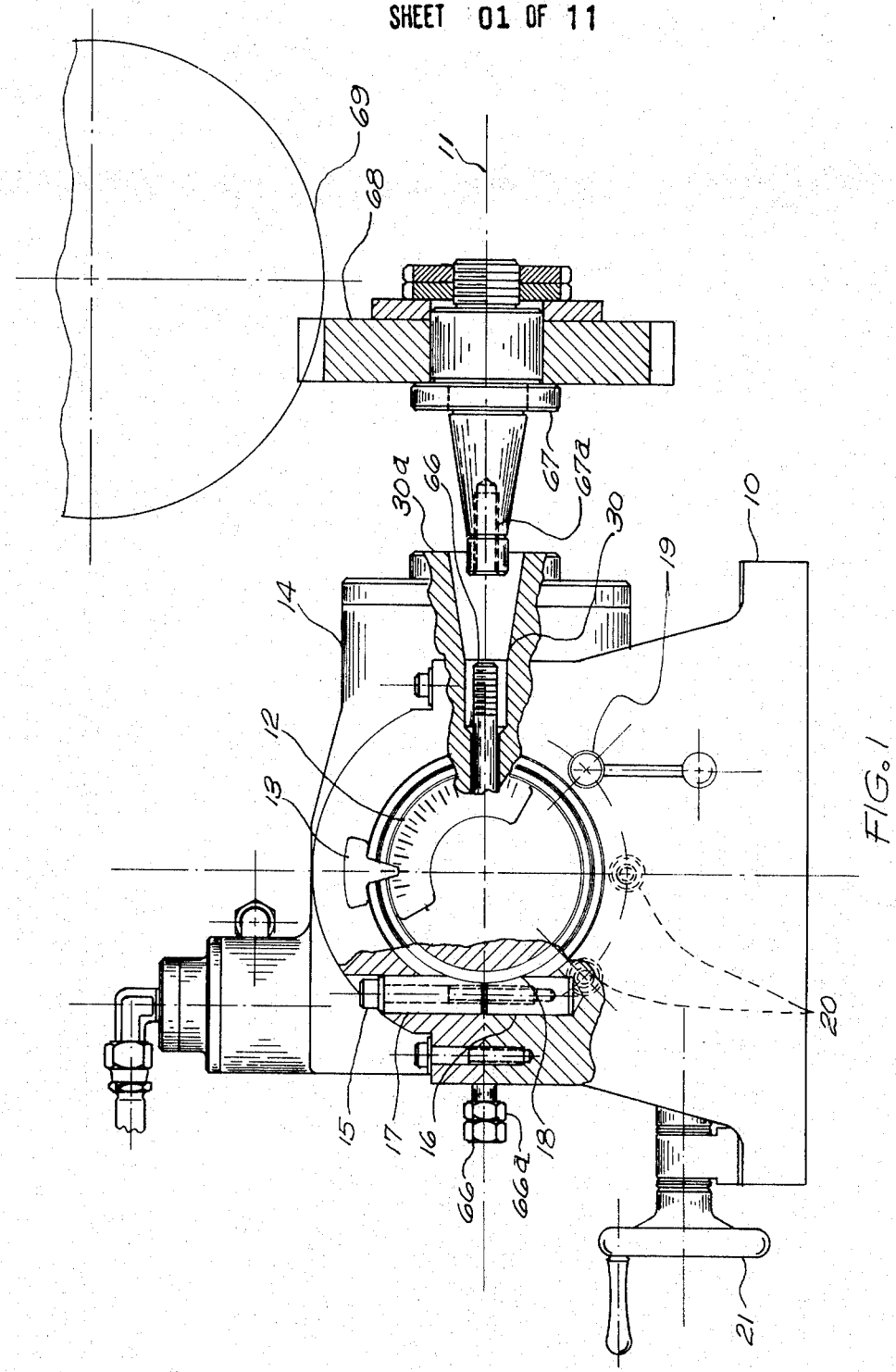
FIG. 1 is a side elevational view of an indexing and drive unit which includes an indexing mechanism embodying this invention, partially broken away and shown in section, and also showing an arbor carrying a workpiece in position for insertion into the nose of the spindle and a cutting device in position above the workpiece.

THE EMBODIMENT OF FIGS. 1 to 6 and 11

Referring to FIGS. 1 to 5, the indexing mechanism comprises a base 10 and a housing 14. The base may be detachably mounted on a reciprocating table (not shown) which periodically moves the unit longitudinally towards and away from the rotatable workpiece machining tool 69 (FIG. 1), thereby to cause the workpiece 68 to periodically contact the machining tool, as is well known in the art.

The spindle 30 is mounted for rotation about its axis 11. It is supported for rotation by the tapered roller bearing 33 (FIG. 3) mounted in the housing 14 near the front end of the spindle and by the tapered roller bearing 35 mounted in the housing inwardly of the index plate 34. The bearings 33 and 35 are suitably preloaded by the adjustment of the two locknuts 36 and 37 (FIG. 3).

Figure 3:
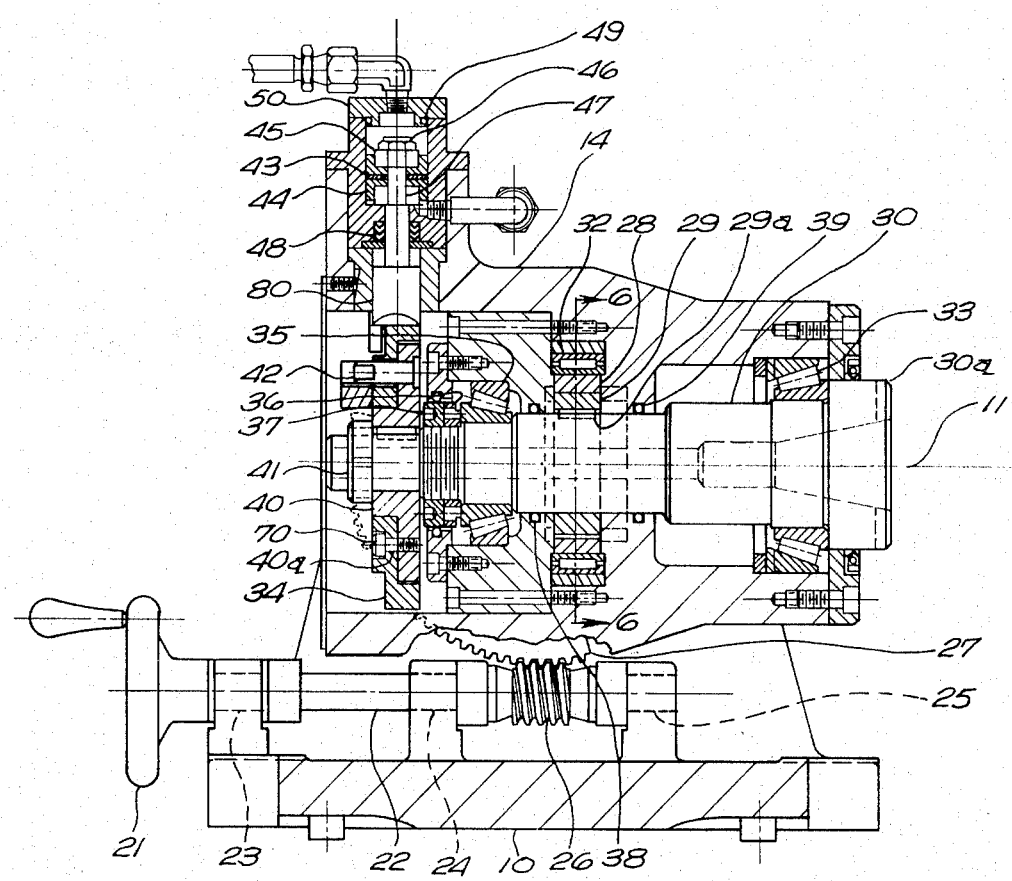
FIG. 3 is a section taken on the line 3—3 of FIG. 4.

Referring to FIGS. 1 and 3, the nose 30a of the spindle has a standard internal taper to permit the use of existing tools such as a standard taper arbor 67 for supporting a workpiece 68. The arbor, referred to in the claims as a "workpiece holding member," is secured to the spindle by the draw bolt 66 and locknuts 66a, the draw bolt extending longitudinally through the spindle with its exteriorly threaded end received in the interiorly threaded hole 67a in the arbor. The workpiece 68 is secured to the spindle by any conventional means.

Figure 6:
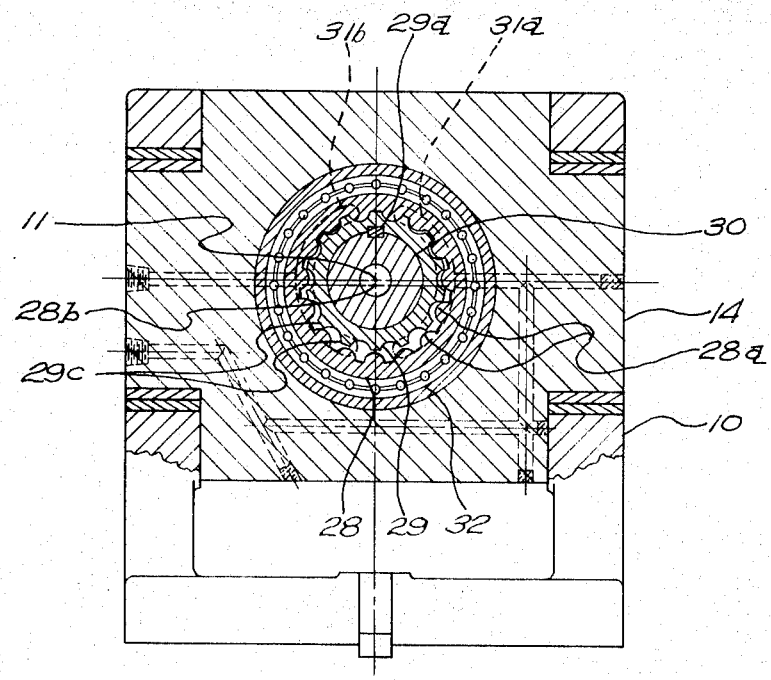
FIG. 6 is a section taken on the line 6—6 of FIG. 3 to show details of the fluid motor.
Figure 2:
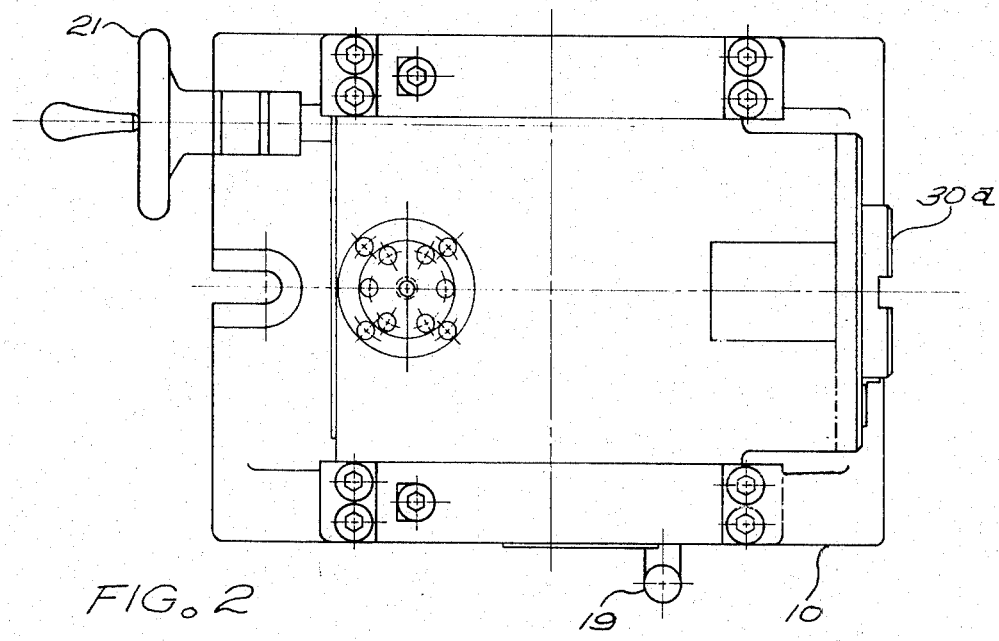
FIG. 2 is a top plan view of the unit shown in FIG. 1.

Referring to FIGS. 3 and 6, the fluid motor 28, 29 is adapted to continuously rotate the spindle in one direction about its axis. The term "fluid motor" as used herein includes a motor which is driven by either a liquid or a gaseous medium. The motor is located within the housing and it is substantially concentric with the spindle as shown in FIG. 6. It is positioned between the index plate 34 and the nose 30a which is referred to in the claims as "means for mounting the workpiece-holding means."

The fluid motor comprises the inner member 29 which is attached to the spindle by the key 29a with its axis substantially coinciding with the axis 11 of the spindle. It has a series of spaced members or teeth 29c extending outwardly from its periphery. The outer member 28 surrounds the inner member and it is substantially concentric therewith. It is provided with a series of inwardly extending teeth 28a. The inner member 29 has one less tooth than the outer member 28. The axis 28b of the outer member is located slightly below the axis 11 of the inner member, for example 0.090" ± 0.0005", consequently, it is substantially concentric therewith and with the axis 11 of the spindle. The inner surface of the outer member 28 is spaced from the outer surface of the inner member for a progressively increasing distance for a portion thereof as shown in FIG. 6.

Pressurized fluid of adequate pressure and volume is supplied from suitable means, such as a pump (not shown), through the port 31a to the space between the outer and inner members and it flows outwardly from this space through the port 316. Pressures of from 800 psi to 3,000 psi may be used. The fluid is prevented from leaking by the seals 38 and 39 (FIG. 3) which are mountedin the housing 14.

The outer member 29 is mounted for rotation relative to the housing 14 by the roller bearing assembly 32.

By coaction with the teeth of the inner and outer members, the fluid medium causes the inner member and the spindle to be rotated in the direction of flow of the pressure medium and this provides a constant torque which rotates the inner member and the spindle about the axis 11 in a clockwise direction looking at FIG. 6.

Figure 4:
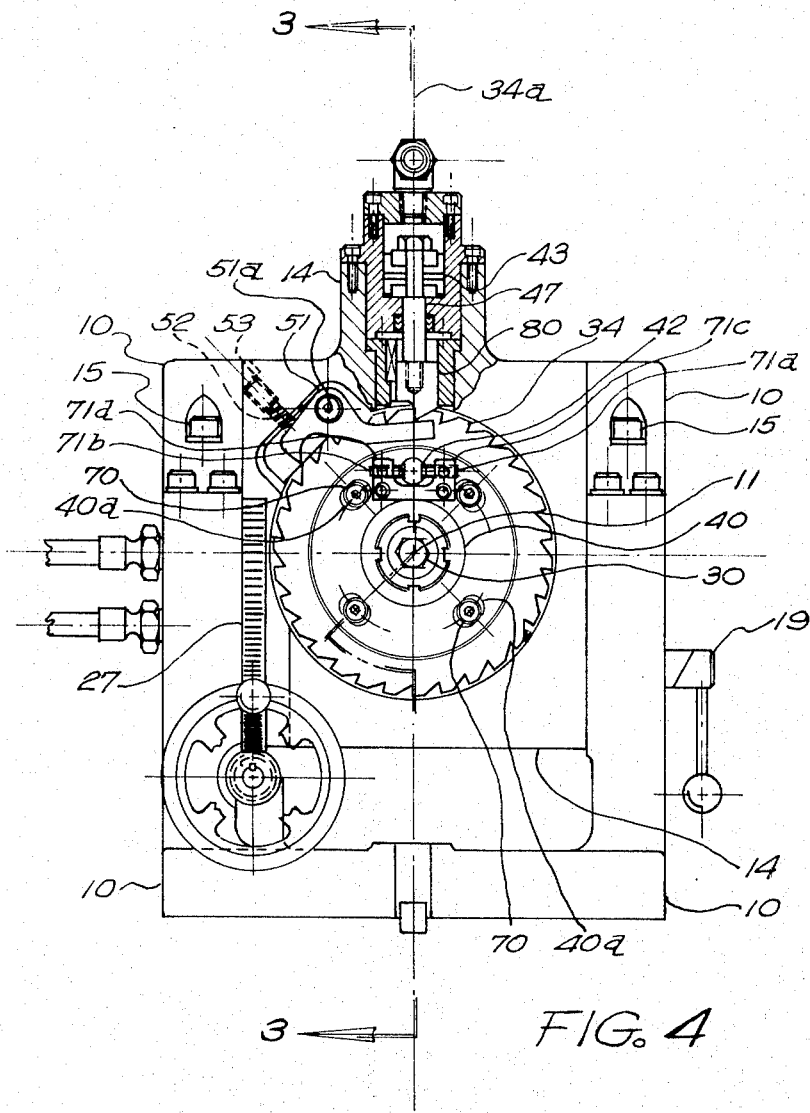
FIG. 4 is an end view looking from left to right at FIG. 3, partially broken away and shown in section.

As shown in FIGS. 3 and 4, the locating wedge 80 provides a precise stop for the teeth of the index plate 34 when the wedge is in its lowered position shown in FIG. 4. The locating wedge is mounted for reciprocation upwardly and downwardly in a bore in the housing. It is driven by fluid under pressure operating periodically on opposite sides of the piston 43. Suitable seals 44 (FIG. 3), spacers 45 and a retaining nut 46, are all mounted on a common piston rod 47. Seals 48 and 49 and the end cap 50 contain the working fluid within the cylinder bore. The locating wedge 80 is mounted downwardly into its locating position (see FIG. 4) by fluid pressure exerting a force on the top of the piston 43 and it is retracted upwardly by fluid pressure exerted on the bottom of the piston. When the locating wedge is retracted upwardly, it moves out of contact with the mating tooth of the index plate, and then the index plate and spindle are rotated angularly by the fluid motor.

When the locating wedge is retracted upwardly, angular rotation of the index plate 34 and the spindle of more than one tooth space is prevented by the pawl 51 (FIG. 4), the left hand end of which is actuated inwardly by the spring 52 which rotates the pawl in a counterclockwise direction about the pivot 51a looking at FIG. 4). The spring 52 is retained by the screw 53.

When the locating wedge 80 is in its lower position (as shown in FIG. 4), it contacts and depresses the adjacent arm of the pawl 51 and causes the tooth of the pawl to be moved out of registration with the notch of the index plate, compressing the spring.

Figure 11:
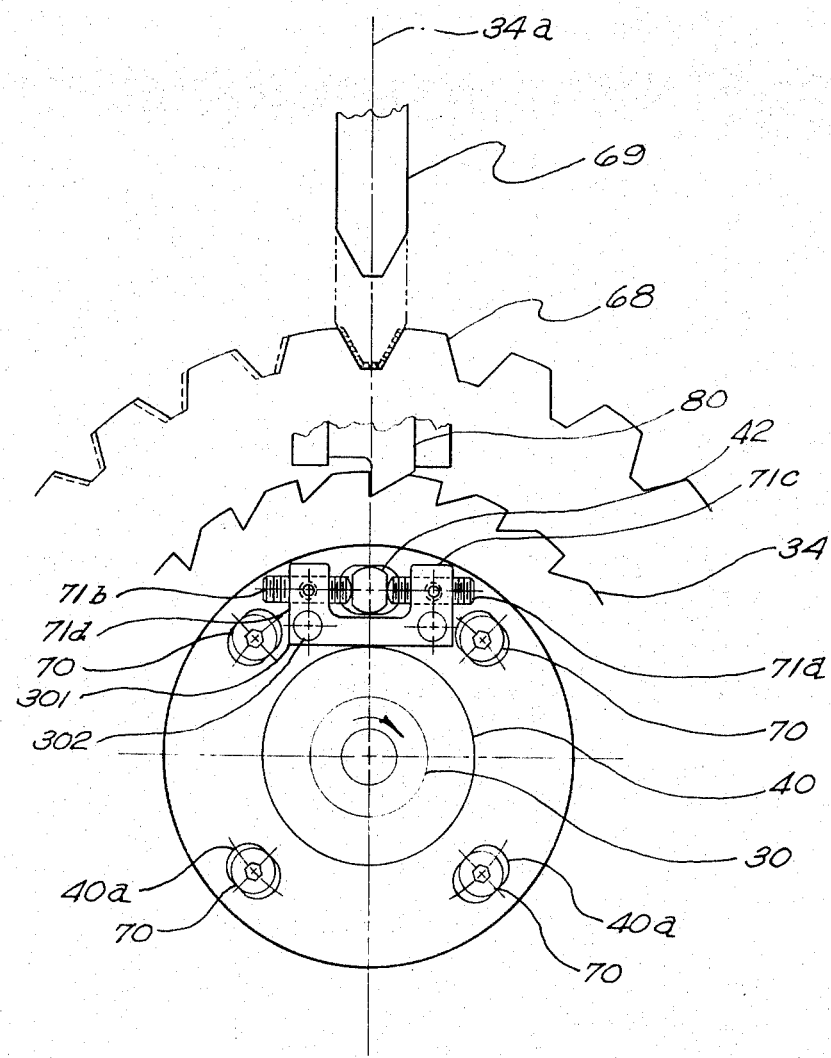
FIG. 11 is an enlarged schematic end view similar to FIG. 4 showing the means for adjusting the spindle angularly about its axis relative to the location plane of the index plate.

The intervals of time during which the locating wedge 80 remains in its normal or lowered position of FIGS. 4 and 11 and in its retracted or upper position may be controlled by various means. One means is automatic. This automatic means may include a cam mounted on the reciprocating table which carries the base and an electrical limit switch mounted on the stationary member which supports the reciprocating table. The limit switch operates a valve which controls the flow of pressurized fluid to the opposite sides of the piston 43. The limit switch is actuated by a cam follower which contacts the surface of the cam during part of the reciprocating movement of the table and passes out of contact with the cam surface during another part of the reciprocating movement of the table. When the follower is out of contact with the cam surface, it actuates the switch to cause the valve to admit fluid to the upper side of the piston and thereby to lower the locating wedge 80 to the position shown in FIGS. 4 and 11. When the follower is in contact with the cam surface, it actuates the switch to cause the valve to admit fluid to the lower side of the piston thereby retracting or elevating the locating wedge 80.

Another means may be manual operation of the limit switch by the machine operator.

The preferred means is the automatic means.

The spindle may be rotated continuously without indexing by holding the locating wedge 80 in its upper position and by either removing the pawl 51 from its mounting or retaining it in an upward position by a suitable latch.

Means is provided for adjusting the spindle angularly about its axis relative to the location plate 34a of the index plate and means is provided for releasably locking the adjusting means in its adjusted position, whereby the location side of each index plate notch may be accurately aligned with a pre-machined notch existing in the workpiece (see FIGS. 3, 4 and 11).

The index plate 34 is detachably secured to the spindle 30 by the index plate hub 40 and the bolts 70 which pass through elongated slots 40a in the index plate. The exteriorly threaded ends (not shown) of the bolts 70 are received in interiorly threaded holes, not shown, in the hub 40.

Stud 42 is affixed to the index plate hub 40. The adjustment screws 71a, 71b pass through lugs 71c, 71d which are secured to the index plate. The inner ends of the screws 71a, 71b bear against opposite sides of the lug 42 and thereby assist the bolts 70 in holding the index plate in a fixed angular position relative to the index plate hub 40. To adjust the spindle angularly about its axis relative to the location plate 34a of the index plate, with the locating wedge 80 in contact with the location side of the index plate notch as shown in FIGS. 4 and 11, the bolts 70 are loosened and then one of the adjustment screws, for example 71b, is moved away from the lug 42 and the other adjustment screw 71a is moved towards the lug. This causes the spindle to be rotated relative to the axes of the index plate. The function of this fine adjustment is to align a notch of the workpiece that has been machined previously with the location plate 34a of the index plate. After the correct adjustment has been made, the four bolts 70 are tightened to hold the index plate and hub in adjusted position.

Referring to FIGS. 1, 2, 3, 4 and 5, the indexing unit also comprises means for moving the housing 14 relative to the base 10 thereby to move the axis of the spindle 11 through a substantial arc from a horizontal position to obtain angular preadjustment of the axes of the spindle 30 and of the workpiece 68 relative to the periphery of workpiece machining tool 69. This angular pre-adjustment is indicated by the dial 12 and indicator 13 shown in FIG. 1.

Figure 5:
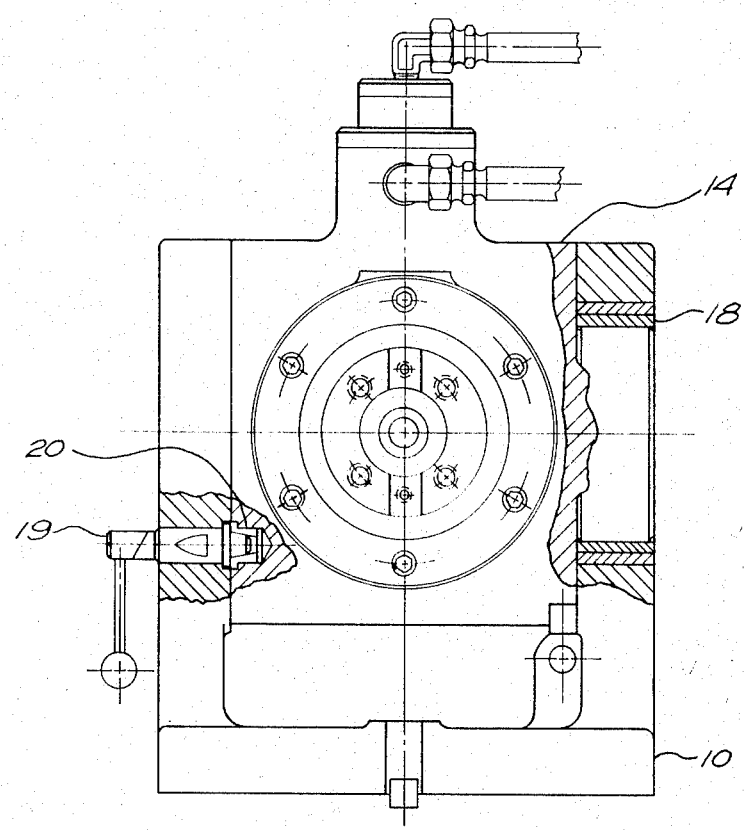
FIG. 5 is an end view looking from right to left at FIG. 3, partially broken away and shown in section.

The screw 15 is threaded into the lock 16 (FIG. 1). When the screw 15 is loosened, the sliding locks 16 and 17 cease to contact the periphery of the bearing ring 18 which is rigidly fastened to the housing 14. A plurality of pre-established relatively large angular pre-adjustments may be quickly made by positioning the index plunger 19 (FIGS. 1, 2, 4 and 5) into one of the accurately located spaced tapered bushings 20 (FIGS. 1 & 5). Thus, the housing 14 may be rotated to place the axis of the spindle at angles of from 20° below horizontal to 100° above horizontal as indicated by indicator 13 on dial 12 and then locked in the adjusted position by tightening the screw 15.

As shown in FIG. 3, rotation of the handwheel 21 rotates the shaft 22 about its axis. Shaft 22 is supported by the bearings 23, 24 and 25 which are machined into the base 10. The worm gear 26 is affixed to the shaft 22 by any suitable means and rotates with it. The gear 27 as shown in FIGS. 3 and 4 is mounted in the housing 14 with its axis of rotation transverse to the axis of the spindle 30. The teeth of the gears 26 and 27 mesh and when the handle 21 is rotated with screw 15 loosened, the axis of the spindle may be adjusted through any desired position from 100° above horizontal to 20° below horizontal. Then it may be retained in adjusted position by tightening the screw 15, FIGS. 1 and 4.

Figure 7:
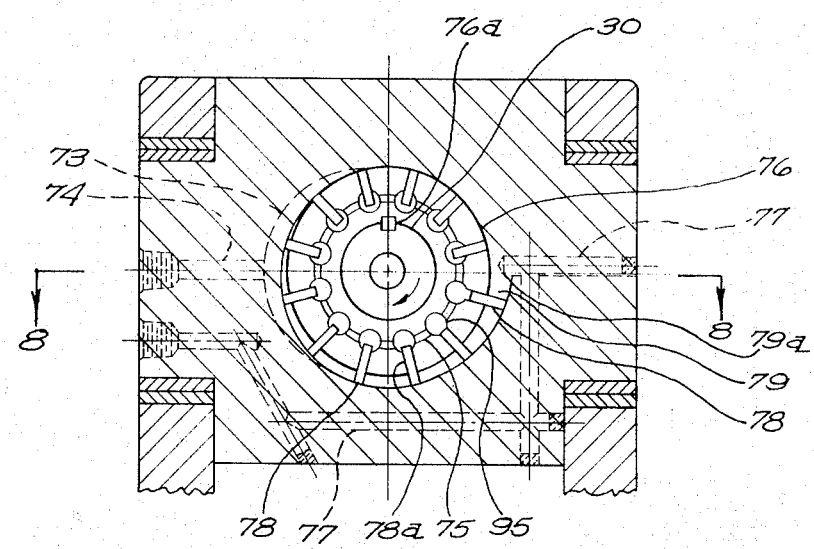
FIG. 7 is a section similar to FIG. 6 showing another embodiment of fluid motor.
Figure 8:
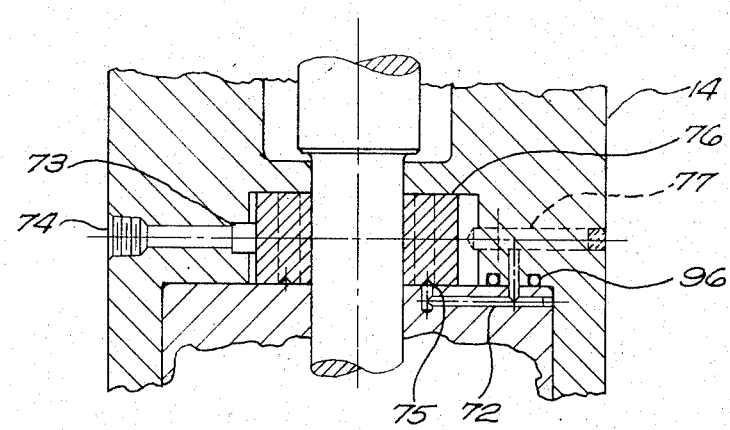
FIG. 8 is a partial section taken on line 8—8 of FIG. 7.

THE EMBODIMENT OF FIGS. 7 and 8

In FIGS. 7 and 8, another embodiment of fluid motor is shown for continuously rotating the spindle in one direction about its axis.

In this embodiment, the impeller hub 76 is keyed at 76a to the spindle 30. The hub 76 is mounted in the same position longitudinally of the housing 14 as the fluid motor 28, 29 shown in FIG. 3.

The impeller blades 78 are mounted slidably in grooves 78a formed in the impeller hub 76. They are urged outwardly into the motor cavity 79 by pressurized fluid in a manner which will be described below.

Pressurized fluid is fed into the motor through the passage 77 and it enters the motor cavity 79 and 79a. This pressurized fluid exerts a force on the impeller blades 78 and thereby exerts a clockwise torque on the impeller hub 76 and thus on the spindle 30 causing the spindle to be continuously rotated in a clockwise direction (looking at FIG. 7) about its axis 11. The pressurized fluid is exhausted from the motor cavity 79 through the passage 74.

It will be noted that the fluid motor 76, 78 is located within the housing substantially concentric with the spindle.

The impeller blades 78 are urged outwardly in the grooves 78a formed in the hub 76 by pressurized fluid which passes from the passage 77 to the passage 72, thence to the annular groove 75, thence to the impeller hub cavities 95 and thence to the inner ends of the impeller blades 78. The passage or port 72 is suitably sealed by the seal 96.

The same means for periodically arresting rotation of the spindle for a predetermined interval of time during which the workpiece may be machined, means for periodically releasing the rotation of the arresting means, means for moving the spindle axis through a substantial arc from a horizontal position and means for adjusting the spindle angularly about its axis and relative to the location plane of the index plate as are described and shown in connection with the embodiment of FIGS. 1 to 5 and 11 may be used with the embodiment of fluid motor shown in FIGS. 7 and 8.

Figure 9:
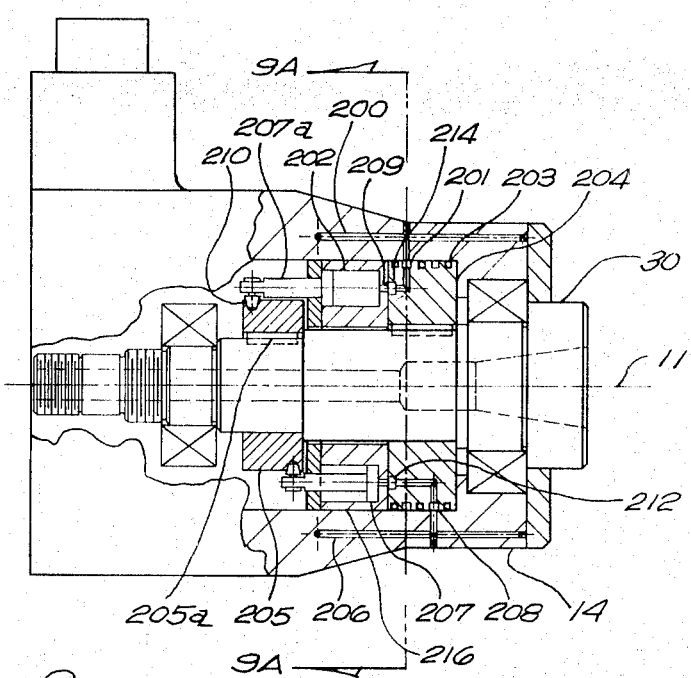
FIG. 9 is a section similar to FIG. 3 showing still another embodiment of fluid motor, the base and other parts of the unit being omitted because they are the same as the parts shown in FIGS. 1 to 5.
Figure 9A:
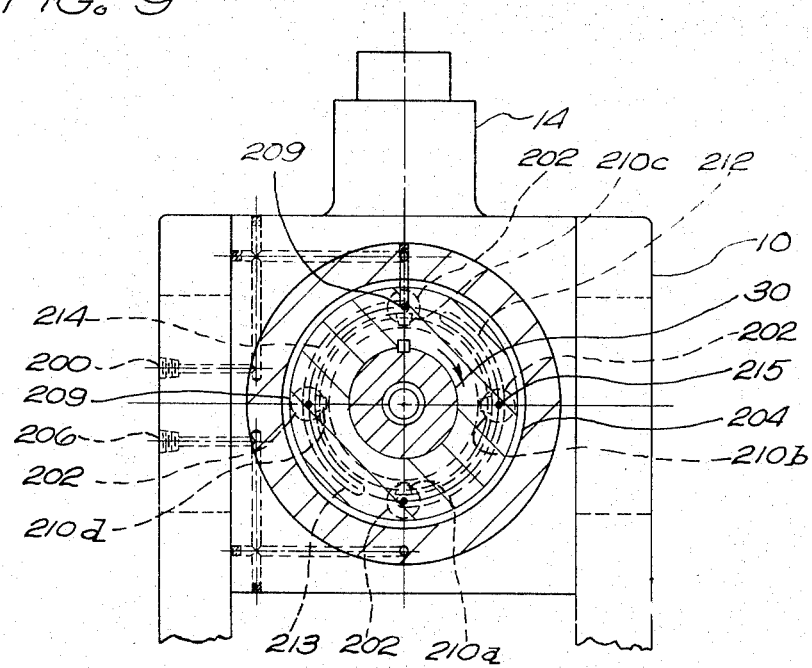
FIG. 9A is a section taken on the line 9A—9A of FIG. 9.
Figure 9B:
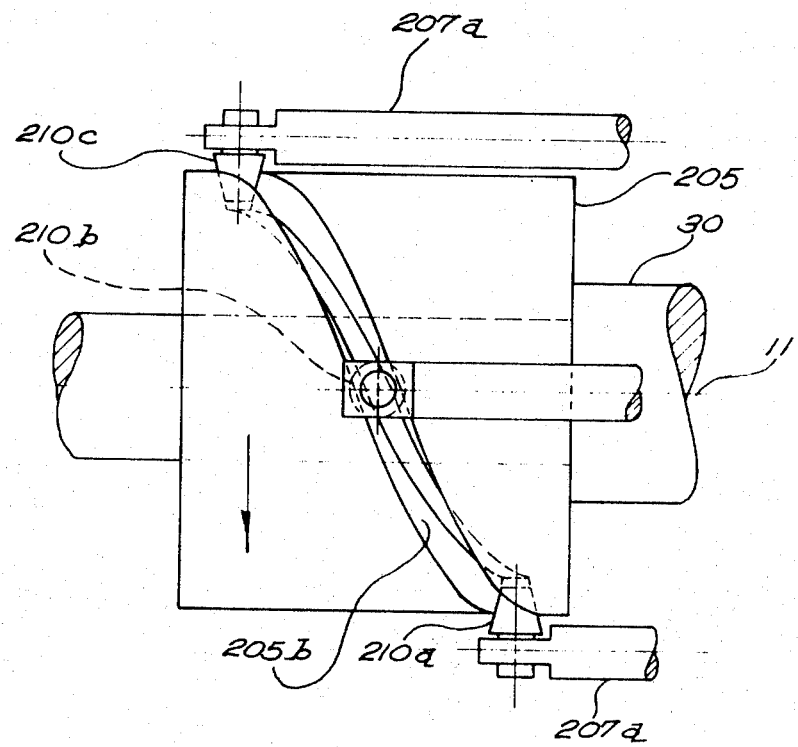
FIG. 9B is a side elevation showing the drum cam, the spindle and three of the cam rollers of FIGS. 9 and 9A, with parts broken away.

THE EMBODIMENT OF FIGS. 9, 9A and 9B

In FIGS. 9, 9A and 9B, another embodiment of fluid motor is shown for continuously rotating the spindle in one direction about its axis.

In this embodiment, four fluid operated cylinders 202 and their associated pistons 207, and piston rods 207a are mounted in the cylinder housing 216 with their axis parallel to the axis 11 of the spindle 30 and equally spaced about the periphery of the spindle 30. A cylindrical drum cam 205 is attached to the spindle 30 by a key 205a. The periphery of the drum cam is machined with a helical groove 205b to accept the tapered cam rollers 210a, 210b, 210c and 210d (FIGS. 9A and 9B) which are mounted on the ends of the piston rods 207a.

A fluid distributor 204 is fixed to the spindle 30 and rotates with it. Pressurized fluid is fed to the fluid distributor through the passage 206 (FIGS. 9 and 9A) and thence into the annular groove 208 (FIG. 9). The fluid is conducted from the groove 208 to the semi-circular groove 212 (FIG. 9A) and thence to the cylinder chambers through ports 215. The cylinder housing 216 (FIG. 9) is integral with the main housing 14 and contains the pistons 207.

As the pressurized fluid enters each cylinder chamber through port 215 (FIG. 9A), it causes the pistons 207 and piston rods 207a to be extended. As the rods are extended, the tapered cam rollers 210a and 210b apply a force against one side wall of the helical groove 205b as shown by the arrows in FIG. 9B. These forces cause the drum cam and the attached spindle 30 to be rotated in the direction of the arrows shown in FIGS. 9A and 9B. When the rollers 210a and 210b are causing rotation of the drum cam and spindle, the side wall of the helical groove 205b at the other side of the drum cam acting against the cam rollers 210c and 210d causes the pistons 207a to move towards their retracted positions thereby exhausting the fluid from the cylinders and readying them for their return power strokes. The retracting pistons exhaust the fluid through ports 209 and thence into the semi-circular groove 214 from which the fluid passes outwardly of the rotating member 204 through the annular groove 201 and outwardly of the housing 14 through the passage 200.

It will be noted that this embodiment of fluid motor is substantially concentric with the spindle. It is also positioned between the index plate and the means for mounting the workpiece holding means which are the same as the corresponding elements shown in the embodiment of FIGS. 1 to 5 and 11. Similarly, the means for periodically arresting rotation of the spindle for a predetermined interval of time during which the workpiece may be machined, the means for periodically releasing the rotation of the arresting means, the means for moving the axis of the spindle through a substantial arc from a horizontal position and the means for adjusting the spindle angularly about its axis and relative to the location plane of the index plate are the same as the corresponding means shown in the embodiment of FIGS. 1 to 5 and 11.

THE EMBODIMENT OF FIGS. 10, 10A, 10B, 10C and 10D

In FIGS. 10, 10A, 10B, 10C and 10D, yet another embodiment of fluid motor is shown for continuously rotating the spindle in one direction about its axis.

Figure 10A:
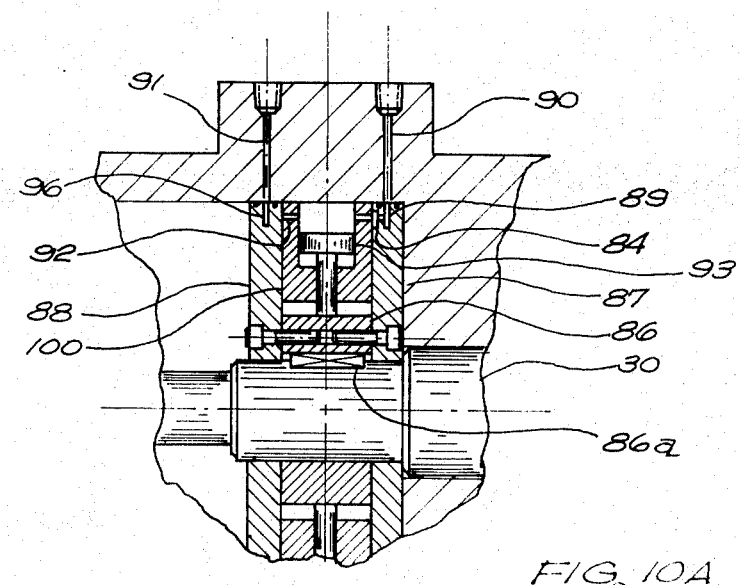
FIG. 10A is a partial enlarged section taken on the line 10A—10A of FIG. 10.
Figure 10:
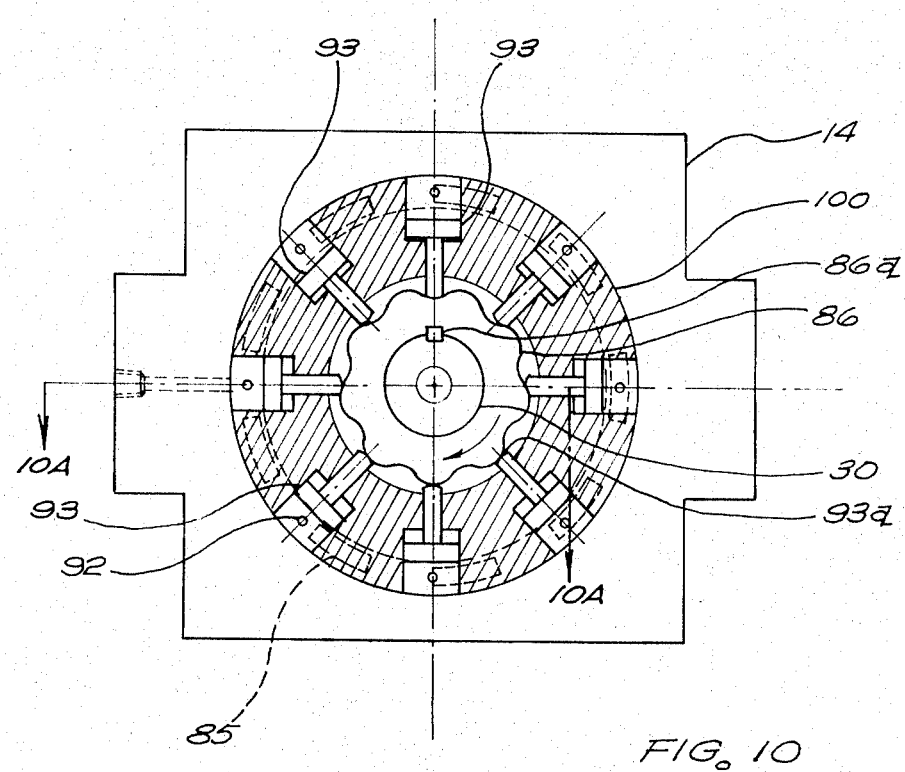
FIG. 10 is a schematic view of yet another embodiment of fluid motor as viewed in FIG. 6 but on an enlarged scale.

Referring to FIGS. 10, 10A and 10B, eight pistons 93 are positioned radially about the cam 86 which is keyed at 86a to the spindle 30. Pistons 93 are energized by pressurized fluid which is fed to the chambers which house the pistons through ports 92. The fluid is distributed progressively to each cylinder 93 by the input distributor plate 88 (FIGS. 10B and 10C) which is attached by bolts 88a to the cam 86 and thus to the spindle 30. The pressurized fluid enters through the passage 91 (FIG. 10A), passes thence into the annular groove 96 (FIGS. 10A and 10B) and thence into the segmented ports 85 (FIG. 10C) which distributes the fluid to the ports 92 in the cylinder housing 100 when said ports are in alignment therewith. The fluid forces the pistons 93 inwardly and by contact between the rods 93a with the surfaces of the cam 86 causes rotation of the spindle in the direction shown by the arrow in FIG. 10.

The fluid is exhausted through the segmented ports 84 in the exhaust distributor 87 which are offset from the segmented ports 85 in distributor 88 by 20° (FIGS. 10B, 10C and 10D), the distributor 87 is suitably affixed to the cam 86 and thus to the spindle 30 and rotates with the spindle. The low pressure fluid is discharged outwardly through the passage 90 to which it is conducted by way of the annular groove 89 in the distributor plate 87 from which it receives the fluid from the segmented ports 84.

It will be noted that the fluid motor, comprising 86, 87, 88 and associated elements, is located within the housing substantially concentric with the spindle. It is also located in the same position longitudinally of the housing 14 as the fluid motor 28, 29 shown in FIG. 3.

The means for periodically arresting rotation of the spindle for a predetermined interval of time during which the workpiece may be machined, the means for periodically releasing the rotation of the arresting means, the means for moving axis of the spindle through a substantial arc from a horizontal position and the means for adjusting the spindle angularly about its axis and relative to the location plane of the index plate are the same as the corresponding means shown in the embodiment of FIGS. 1 to 5 and 11.

While several desirable embodiments of the invention have been shown in the drawings, it is to be understood that this disclosure is for the purpose of illustration only and that various changes in shape, proportion and arrangement of parts as well as the substitution of equivalent elements for those herein shown and described may be made without departing from the spirit and scope of the invention as set forth in the appended claims.

I claim:

1. In an indexing mechanism comprising,
   a housing,
   a spindle mounted for rotation in the housing,
   an index plate mounted adjacent to one end of the spindle substantially coaxially therewith and
   means at the other end of the spindle for mounting a workpiece-holding member substantially coaxially with the spindle,
   the improvement comprising,
   a fluid motor for continuously rotating the spindle in one direction about its axis, said motor being located within the housing substantially concentric with the spindle and positioned between said index plate and said means for mounting the workpiece-holding means,
   means for periodically arresting rotation of the spindle for a predetermined interval of time during which the workpiece may be machined, and
   means for periodically releasing the rotation arresting means,
   whereby the spindle is free for rotation by the fluid motor for a predetermined interval of time.

2. An indexing mechanism according to claim 1 wherein said fluid motor comprises, an inner member which is attached to the spindle substantially concentric therewith and has a series of spaced members extending outwardly from its periphery, an outer member which surrounds the inner member and is substantially concentric therewith but which has an inner surface which is spaced from the outer surface of said inner member for a progressively increasing distance for a portion thereof, a first port for admitting fluid medium under pressure at one locality of the space between the inner and outer members and a second port for conducting the pressure medium outwardly from said space at another locality of said space, whereby the fluid medium causes the inner member and the spindle to be rotated in the direction of flow of the fluid medium.

3. An indexing mechanism according to claim 2 wherein the outwardly extending members comprise teeth which are integral with the inner member.

4. An indexing mechanism according to claim 3 wherein the inner surface of the outer member comprises teeth which mesh with the teeth of the inner member at a portion of its periphery and are spaced from the teeth of the inner member during at least a portion of said space between the inner and outer members, whereby, by coaction with the teeth of the inner and outer members, the fluid medium causes the inner member and the spindle to be rotated in the direction of flow of the pressure medium.

5. An indexing mechanism according to claim 1, wherein said fluid motor comprises an inner member which is attached to the spindle substantially concentric therewith, an outer member which surrounds the inner member and which has an inner surface which is spaced from the outer surface of the inner member for a portion thereof to form a cavity, members mounted on the inner member and extending outwardly therefrom into said cavity, a first port for admitting fluid medium under pressure at one locality of the cavity and a second port for conducting the pressure medium outwardly from said cavity at another locality thereof, whereby the fluid medium causes the inner member and the spindle to be rotated in the direction of flow of the fluid medium.

6. An indexing mechanism according to claim 5, which also comprises means for supplying fluid medium under pressure to the inner ends of said outwardly extending members for urging them outwardly into the cavity.

7. An indexing mechanism according to claim 1, wherein said fluid motor comprises an inner member which is attached to the spindle substantially concentric therewith, a plurality of outer members attached to the housing, each outer member including fluid operated reciprocating means, and means coacting with said inner member for continuously rotating it in one direction about its axis, means for admitting fluid medium under pressure to said reciprocating means and means for conducting the fluid medium outwardly from said reciprocating means.

8. An indexing mechanism according to claim 7, wherein said inner member comprises a cylindrical drum cam containing a peripheral helical cam surface and said means coacting with the inner member comprises a plurality of cam rollers which coact with said cam surface.

9. An indexing mechanism according to claim 1, wherein said fluid motor comprises an inner member which is attached to the spindle substantially concentric therewith, said inner member comprising a peripheral cam surface, an outer member which is attached to the housing, surrounds the inner member and is substantially concentric therewith, a plurality of fluid operated means, a plurality of spaced means extending radially inwardly from said fluid operating means towards the periphery of the inner member, means associated with the inner ends of said radially extending means for coacting with said peripheral cam surface, means for supplying fluid medium under pressure to said fluid operating means for urging said radially extending means inwardly towards said peripheral cam surface, thereby causing axial rotation of said inner member, and means for conducting the pressure medium outwardly from said fluid operating means.

10. An indexing mechanism according to claim 9, wherein said peripheral cam surface comprises a series of substantially equally spaced lobes.

11. An indexing mechanism according to claim 9, wherein said means for supplying fluid medium under pressure comprises a plurality of segmented ports located in a first member which is rotatable by the spindle and said means for conducting the pressurized medium outwardly comprises a plurality of segmented ports located in a second member which is rotatable by the spindle and is positioned at the opposite side of said outer member from said first member, said segmented ports of said second member being offset from said segmented ports of said first member.

12. An indexing mechanism according to claim 1 which also comprises means for moving the spindle axis through a substantial arc from a horizontal position.

13. An indexing mechanism according to claim 1 which also comprises means for moving the spindle axis through an arc of at least 90° above a horizontal position.

14. An indexing mechanism according to claim 1 which also comprises means for moving the spindle axis through an arc of at least 100° above a horizontal position and at least 20° below a horizontal position.

15. An indexing mechanism according to claim 1 wherein the housing is supported by a base and the indexing mechanism also comprises means for moving the housing relative to the base and thereby moving the axis of the spindle through a substantial arc from a horizontal position.

16. An indexing mechanism according to claim 15 wherein the means for moving the housing relative to the base comprises a first gear mounted for axial rotation in the base and a second gear mounted on the housing with its axis transverse to the axis of the spindle, the teeth of the first gear meshing with the teeth of the second gear, and means for rotating the first gear, whereby upon rotation of the first gear the axis of the spindle may be moved through a substantial arc from a horizontal position.

17. An indexing mechanism according to claim 1, wherein the index plate comprises a series of spaced peripheral notches and the mechanism also comprises means for adjusting the spindle angularly about its axis and relative to the location plane of the index plate and means for releasably locking the said means for adjusting in its adjusted position, whereby the location side of each notch may be accurately aligned with a premachined notch existing in the workpiece.

18. An indexing mechanism according to claim 17 wherein the index plate is mounted on the spindle by means of an index plate supporting member attached to the spindle, the index plate supporting member comprises a plurality of spaced members which extend outwardly from its surface which is adjacent to a surface of the index plate, the index plate comprises a plurality of elongated slots for receiving said outwardly extending members, the index plate supporting member comprises an outwardly extending lug and said means for adjusting the spindle angularly comprises longitudinally movable means on the index plate for engaging sides of said outwardly extending lugs, whereby the spindle may be adjusted angularly relative to the location plane of the index plate and releasably held in its angularly adjusted position by said outwardly extending members.

19. In an indexing mechanism comprising, a housing, a spindle mounted for rotation in the housing, an index plate mounted adjacent to one end of the spindle coaxially therewith, and means at the other end of the spindle for mounting a workpiece-holding member coaxially with the spindle, the improvement comprising, a fluid motor for continuously rotating the spindle in one direction about its axis, said motor being located within the housing substantially concentric with the spindle and positioned between said index plate and said means for mounting the workpiece-holding means.

\* \* \* \* \*

UNITED STATES PATENT OFFICE
CERTIFICATE OF CORRECTION

Patent No. 3,785,223   Dated January 15, 1974

Inventor(s) Richard C. Steele

It is certified that error appears in the above-identified patent and that said Letters Patent are hereby corrected as shown below:

Column 1, line 39, change "50" to --so--

Column 2, line 6, change "tilted" to --titled--

Column 6, line 1, change "316" to -- 31b --.

line 4, change "mountedin" to --mounted in-- line 26, change "mounted" to --moved--

Column 7, line 12, change "plate" to --plane-- line 31, change "plate" to --plane-- line 42, change "plate", first occurrence, to --plane--

Signed and sealed this 4th day of February 1975.

(SEAL)
Attest:

McCOY M. GIBSON JR.
Attesting Officer

C. MARSHALL DANN
Commissioner of Patents